United States Patent
Liechti

(10) Patent No.: US 9,713,836 B2
(45) Date of Patent: Jul. 25, 2017

(54) APPARATUS AND METHOD FOR TRANSPORTING SPRINGS, AND MACHINE FOR PRODUCING A STRING OF POCKET SPRINGS

(71) Applicant: Spuhl GmbH, Wittenbach (CH)

(72) Inventor: Urs Liechti, Goldach (CH)

(73) Assignee: Spühl GmbH, Wittenbach (CH)

( * ) Notice: Subject to any disclaimer, the term of this patent is extended or adjusted under 35 U.S.C. 154(b) by 0 days.

(21) Appl. No.: 15/105,704

(22) PCT Filed: Oct. 28, 2014

(86) PCT No.: PCT/EP2014/073054
§ 371 (c)(1),
(2) Date: Jun. 17, 2016

(87) PCT Pub. No.: WO2015/090695
PCT Pub. Date: Jun. 25, 2015

(65) Prior Publication Data
US 2016/0311010 A1    Oct. 27, 2016

(30) Foreign Application Priority Data
Dec. 17, 2013   (EP) .................................. 13197602

(51) Int. Cl.
*B65G 47/92* (2006.01)
*B65G 47/84* (2006.01)
(Continued)

(52) U.S. Cl.
CPC .............. *B21F 27/16* (2013.01); *B21F 33/04* (2013.01); *B65G 47/848* (2013.01); *B65G 47/92* (2013.01); *B65G 2201/0232* (2013.01)

(58) Field of Classification Search
CPC ........ B21F 27/16; B21F 33/04; B65G 47/848; B65G 47/92; B65G 2201/0232
(Continued)

(56) References Cited

U.S. PATENT DOCUMENTS 3,012,590 A   12/1961   Hodges, Jr. et al.
3,774,652 A   11/1973   Sturm
(Continued)

FOREIGN PATENT DOCUMENTS

DE    19529912 A1   2/1997
EP     2316783 A1   5/2011

OTHER PUBLICATIONS

International Search Report with Written Opinion dated Mar. 3, 2015 in PCT Application No. PCT/EP2014/073054, 11 pages.

*Primary Examiner* — Mark A Deuble
(74) *Attorney, Agent, or Firm* — Shook Hardy & Bacon, LLP

(57) ABSTRACT

An apparatus for transporting springs comprises a transport device configured to receive a spring and a retaining mechanism configured to retain the spring received by the transport device. The retaining mechanism has at least one retaining member which comprises a magnetic material and which is mounted to be displaceable relative to the transport device. The apparatus comprises a release mechanism configured to release the spring received by the transport device. The release mechanism is configured to cause a relative displacement between the transport device and the at least one retaining member. The invention also relates to a method of transporting springs.

15 Claims, 12 Drawing Sheets

(51) Int. Cl.
*B21F 33/04* (2006.01)
*B21F 27/16* (2006.01)

(58) Field of Classification Search
USPC ... 198/377.05, 377.09, 468.5, 472.1, 867.04, 198/803.6
See application file for complete search history.

(56) References Cited

U.S. PATENT DOCUMENTS

| | | | |
|---|---|---|---|
| 4,120,392 A | 10/1978 | Sturm | |
| 6,561,341 B1* | 5/2003 | Kouda | B65G 47/848 198/472.1 |
| 6,640,836 B1* | 11/2003 | Haubert | B21F 3/027 140/3 CA |
| 2002/0017334 A1 | 2/2002 | Andrea et al. | |
| 2012/0275895 A1* | 11/2012 | Graf | B68G 9/00 414/749.1 |
| 2013/0247792 A1* | 9/2013 | Coots | E01B 29/32 104/2 |

* cited by examiner

APPARATUS AND METHOD FOR TRANSPORTING SPRINGS, AND MACHINE FOR PRODUCING A STRING OF POCKET SPRINGS

CROSS-REFERENCE TO RELATED APPLICATIONS

This application claims priority under 35 U.S.C. §365 to PCT/EP2014/073054, filed on Oct. 28, 2014, entitled "Apparatus and Method for Transporting Springs, and Machine for Producing a String of Pocket Springs," and European Patent Application No. EP13197602.9, filed Dec. 17, 2013, entitled "Apparatus and Method for Transporting Springs, and Machine for Producing a String of Pocket Springs," the entirety of the aforementioned applications are incorporated by reference herein.

TECHNICAL FIELD

The invention relates to apparatuses for transporting springs. The invention relates in particular to an apparatus and a method for transporting springs between stations of a machine, e.g. of a machine for forming a string of pocket springs or another machine configured to form at least a portion of an innerspring unit.

BACKGROUND

Mattresses, sofas or other bedding or seating furniture may be provided with innerspring units. A machine may be provided to form an innerspring unit or a part of an innerspring unit, e.g. a string of pocket springs. Innerspring units which use such pocket springs are generally considered to offer enhanced comfort compared to many conventionally sprung mattresses or other bedding or seating furniture using springs connected by a wire framework.

Machines used for manufacturing an innerspring unit or a portion thereof, such as a string of pocket springs, may have various processing stations. A spring coiler station may be provided to form springs. A pocketing station may be provided to form a string of pocket springs from a plurality of springs and a band of pocket material. The pocketing station may be configured to insert springs into a tube of pocket material and to define the pockets by performing an ultrasonic welding operation, for example.

It is desired that springs can be transported automatically in machines used for forming at least a portion of an innerspring unit. Transport devices of various types may be used for transporting springs in such machines including, without limitation, conveyors, pivot arms, or linearly moving transport elements.

An increasing demand for high operation speed, e.g. a desire to increase the number of springs that can be transported per time, increases the need for securely retaining a spring while it is being transported. Transport devices may be configured to rely on frictional locking, e.g. by providing a clamping force that acts on a compressed spring. When relying only on frictional locking for securing a spring during transport, this may limit the locations at which the transport device may be used and/or may require complex mechanisms for compressing the springs upon insertion into the transport device.

SUMMARY

There is a continued need in the art for an apparatus and method for transporting springs which mitigates at least some of the drawbacks of conventional techniques. There is in particular a need in the art for an apparatus and method which allows springs to be securely retained at a transport device while using a simple configuration.

According to embodiments of the invention, a transport device is provided such that it displaceable to transport a spring received by the transport device. A retaining mechanism includes a retaining member which comprises a magnetic material. The retaining member is mounted to be displaceable relative to the transport device. A relative displacement between the retaining member and the transport device is effected to release a spring retained by the retaining member.

In an apparatus having such a configuration, the magnetic material is operative to retain the spring by magnetic forces. The spring may be released in a simple way by displacing the retaining member relative to the transport device. This relative displacement may be effected in various ways. For illustration, the retaining member may be selectively engaged by a release member as the transport device approaches a release position at which the spring is to be released. The engagement between the release member and the retaining member, in combination with the motion of the transport device, may cause the transport device to move relative to the retaining member, thereby producing or enlarging a gap between the magnetic material and the spring received by the transport device.

An apparatus for transporting springs according to an embodiment comprises a transport device configured to receive a spring. The apparatus comprises a retaining mechanism configured to retain the spring received by the transport device. The retaining mechanism has at least one retaining member which comprises a magnetic material and which is mounted to be displaceable relative to the transport device. The apparatus comprises a release mechanism configured to release the spring received by the transport device. The release mechanism is configured to effect a relative displacement between the transport device and the at least one retaining member.

The release mechanism may comprise a release member configured to selectively engage the retaining mechanism to effect the relative displacement between the transport device and the at least one retaining member.

The release mechanism may comprise a release member configured to selectively engage the at least one retaining member to effect the relative displacement between the transport device and the at least one retaining member.

The release member may be configured to selectively engage the at least one retaining member when the transport device approaches a position at which the spring is to be released from the transport device.

The release member may be stationary relative to a frame of the apparatus. A selective engagement between the release member and the at least one retaining member may be caused by the motion of the transport device towards the position at which the spring is to be released.

The release member may be positioned to engage the at least one retaining member when the transport device moves in a first direction and to disengage the at least one retaining member when the transport device moves in a second direction opposite to the first direction. The transport device may be configured to perform a reciprocating motion between a first position at which the spring is received and a second position at which the spring is released from the transport device. The retaining member may automatically revert to a position, relative to the transport device, for retaining a spring as the transport device moves from the second position back to the first position.

The release member may be positioned to engage the at least one retaining member when the transport device moves in a first direction and to disengage the at least one retaining member when the transport device continues to move in the first direction. The transport device may be rotatably mounted. Continuing rotation of the transport device may cause the at least one retaining member to change, in a cyclic manner, between a state in which it can retain a spring on the transport device and another state in which the magnetic material of the at least one retaining member is retracted to release the spring.

The at least one retaining member may be supported on the transport device.

The at least one retaining member may be supported on the transport device such that the at least one retaining member maintains a rest position relative to the transport device until the release member engages the at least one retaining member.

The apparatus may comprise a bias mechanism to bias the at least one retaining member into the rest position relative to the transport device. The bias mechanism may cause the at least one retaining member to automatically revert to the rest position relative to transport device when the release member and the at least one retaining member disengage.

The bias mechanism may be configured to store energy when the at least one retaining member and the transport device are displaced relative to each other to release a spring.

The bias mechanism may comprise a resilient element coupled to the transport device and the at least one retaining member. Alternatively or additionally, the bias mechanism may comprise a bias magnet. The bias magnet may be fixedly attached on one of the transport device and/or the retaining member and may act onto a ferromagnetic or paramagnetic portion of the other one of the transport device and/or the retaining member. The bias magnet may be a permanent magnet.

The magnetic material may be arranged on the retaining member to abut on a spring received by the transport device when the at least one retaining member is in the rest position relative to the transport device.

The transport device may have a support surface configured to support the received spring. The apparatus may be configured such that the magnetic material of the at least one retaining member is retracted relative to the support surface to release the spring.

When the at least one retaining member is in its rest position relative to the transport device, a surface of the magnetic material may be flush with the support surface.

The at least one retaining member may be pivotably supported on the transport device.

The at least one retaining member may be supported on the transport device to be displaceable in a translatory manner relative to the transport device.

The transport device may be configured to simultaneously receive two springs or more than two sprigs. This may increase the rate at which springs may be transported.

The transport device may be a transport wheel configured to receive the spring from a spring coiler. The transport wheel may be a cooling wheel in which springs are allowed to cool down after they have been formed.

The transport device may be configured to output the spring to a device for pocketing the spring. The transport device may be configured to output the spring to a device for setting the spring.

The magnetic material may be a permanent magnet. The magnetic material may comprise a ferromagnetic material. The magnetic material may comprise a paramagnetic material.

The magnetic material may be arranged on the at least one retaining member such that it extends along a direction parallel to a center axis of the spring received by the transport device.

The at least one retaining member may be a passive element. The at least one retaining member may have no power supply. The relative displacement between the at least one retaining member and the transport device may be brought about by the motion of the transport device in combination with an engagement between the at least one retaining member and the engagement between the release member and the at least one retaining member. This allows the release to be implemented using a simple and robust construction.

The transport device may be supported such that it is displaceable relative to a frame of the apparatus. The transport device may be pivotable about a pivot axis. The transport device may be linearly displaceable. The transport device may be mounted for a combined pivoting and translatory motion.

The apparatus may comprise a drive mechanism for driving the transport device between a first position to receive the spring and a second position to release the spring.

The drive mechanism may comprise at least one pivot arm. The drive mechanism may comprise a first pivot arm and a second pivot arm. The drive mechanism may be configured such that an end of the second pivot arm is pivotably coupled to the transport device to displace the transport device along the first pivot arm.

The drive mechanism may be configured to rotate the transport device.

The apparatus may comprise a controller for controlling operation of the drive mechanism. The controller may control operation of at least one other station of a machine for forming a string of pocket springs.

According to another embodiment, a machine for forming a string of pocket springs is provided. The machine comprises a spring coiler configured to form springs. The machine comprises a device for pocketing or setting the springs formed by the spring coiler. The machine comprises at least one apparatus for transporting springs according to an embodiment to transport springs from the spring coiler to the device for pocketing or setting the springs.

The machine may comprise a first apparatus according to an embodiment, which is configured to receive the springs from the spring coiler. The transport device of the first apparatus may be a transport wheel, e.g. a cooling wheel.

The machine may comprise a second apparatus according to an embodiment which is configured to receive the springs from the first apparatus and to transport the springs to the device for pocketing or setting the springs.

The device for pocketing the springs may be configured to insert the springs into a tube of pocket material. The device for pocketing the springs may comprise at least one ultrasonic welding unit to form longitudinal and/or transverse ultrasonic welding seams.

A method of transporting springs according to an embodiment comprises receiving a spring by a transport device. The method comprises retaining the spring on the transport device using at least one retaining member which comprises a magnetic material and which is mounted to be displaceable relative to the transport device. The method comprises causing the transport device to move. The method comprises effecting a relative displacement between the at least one retaining member and the transport device to release the spring from the at least one retaining member at a release position.

The method may be performed automatically by an apparatus or machine according to an embodiment.

Additional features which may be implemented in the method according to embodiments and the effects attained thereby correspond to the features explained with reference to the apparatus according to embodiments.

In the method, a release member may selectively engage the at least one retaining member to effect the relative displacement between the transport device and the at least one retaining member.

In the method, the release member may be stationary relative to a frame of the apparatus. Selective engagement between the release member and the at least one retaining member may be caused by the motion of the transport device and the at least one retaining member formed thereon.

In the method, the release member may be positioned to engage the at least one retaining member when the transport device moves in a first direction and to disengage the at least one retaining member when the transport device moves in a second direction opposite to the first direction.

In the method, the release member may be positioned to engage the at least one retaining member when the transport device moves in a first direction and to disengage the at least one retaining member when the transport device continues to move in the first direction.

In the method, the at least one retaining member may be supported on the transport device.

In the method, the at least one retaining member may be supported on the transport device such that the at least one retaining member maintains a rest position relative to the transport device until the release member engages the at least one retaining member.

The method may comprise biasing the at least one retaining member into the rest position relative to the transport device.

In the method, the transport device may simultaneously receive two springs or more than two sprigs.

In the method, the transport device may be a cooling wheel configured to receive the spring from a spring coiler.

In the method, the transport device may be configured to output the spring to a device for pocketing or setting the spring.

In the method, the magnetic material may be a permanent magnet. The magnetic material may comprise a ferromagnetic material. The magnetic material may comprise a paramagnetic material.

In the method, the magnetic material may be arranged on the at least one retaining member such that it extends along a direction parallel to a center axis of the spring received by the transport device.

In the method, the at least one retaining member may be a passive element. The relative displacement between the at least one retaining member and the transport device may be brought about by the motion of the transport device in combination with an engagement between the at least one retaining member and the engagement between the release member and the at least one retaining member.

Apparatuses, machines, and methods according to embodiments provide a simple and reliable mechanism for retaining springs while the springs are being transported.

A retaining member comprising a magnetic material is used to retain springs received by a transport device. The springs may be selectively released by a relative displacement between the retaining member and the transport device, to produce or enlarge a gap between the magnetic material and the spring. The relative displacement may be brought about using simple mechanical elements which mechanically engage the release mechanism and which may even be stationary and do not require active control. The retaining member may be configured as a passive element, obviating the need for supplying power to the retaining member and/or actively controlling the retaining member.

BRIEF DESCRIPTION OF THE DRAWINGS

Embodiments of the invention will be described with reference to the accompanying drawings in which the same or similar reference numerals designate the same or similar elements.

DESCRIPTION OF EMBODIMENTS

Exemplary embodiments of the invention will be described with reference to the drawings. While some embodiments will be described in the context of specific fields of application, e.g. in the context of machines for producing a string of pocket springs, the embodiments are not limited to this field of application. The features of the various embodiments may be combined with each other unless specifically stated otherwise.

Figure 1:
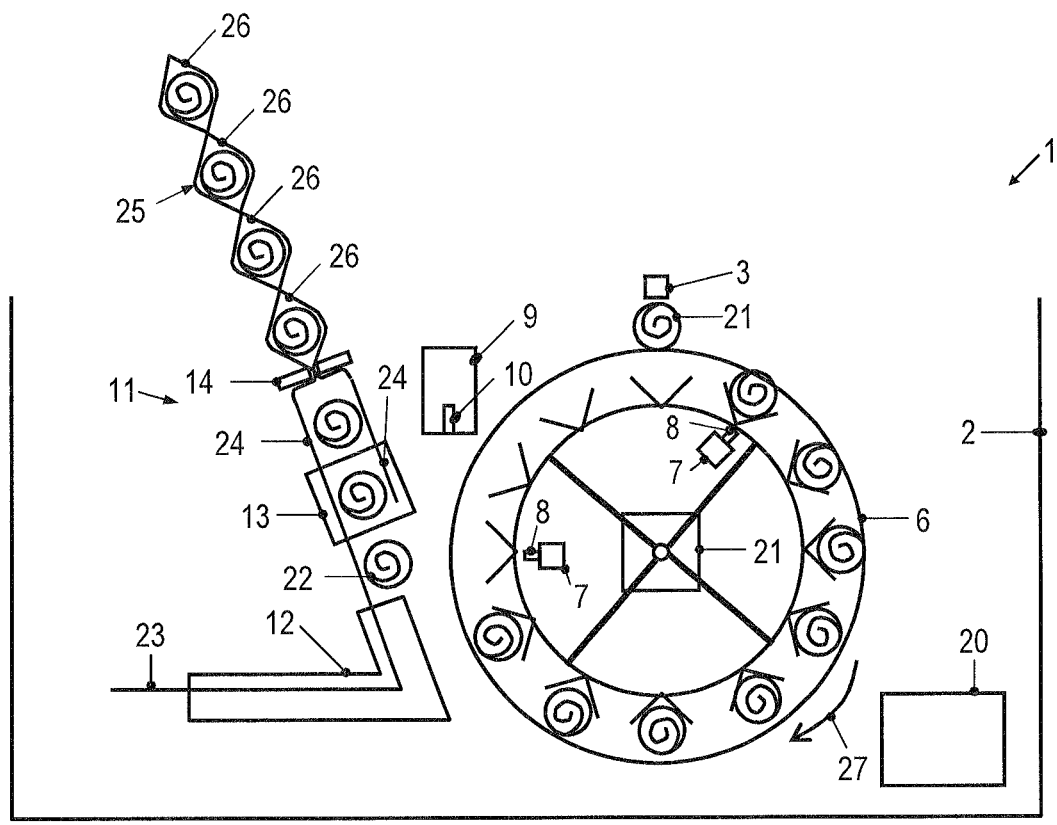
FIG. 1 shows a schematic side view of a machine according to an embodiment.

FIG. 1 illustrates a machine 1 for forming a string 25 of pocket springs 26 according to an embodiment. The machine 1 may have a frame 2 on which various components, e.g. a transport wheel which may be configured as a cooling wheel 6, a pocketing station 11, and/or an apparatus 9 for transporting springs from the cooling wheel 6 to the pocketing station 11 are supported.

The machine 1 may comprise a spring coiler 3 which forms a spring 21. The spring coiler 3 may form the spring 21 in proximity to the cooling wheel 6. As will be explained in more detail below, the cooling wheel 6 may be provided with a retaining member 7 having a magnetic material 8 or with several retaining members 7, which respectively have a magnetic material 8 to retain a spring received by the cooling wheel 6 by magnetic force. The retaining member(s) 7 may be configured to be selectively displaced, e.g. by a pivoting or translatory displacement, relative to the cooling wheel to release a spring.

The machine 1 may comprise another apparatus 9 for transporting springs. The apparatus 9 may comprise a transport device which is mounted to be displaceable relative to the frame 2 of the machine 1. The transport device of the apparatus 9 may be displaced between a first position in proximity to the cooling wheel 6 to receive a spring and a second position in proximity to the pocketing station 11 to release the spring. A retaining member 10 which comprises a magnetic material may be supported on the transport device. The retaining member 10 may be located in proximity to or may even abut on the spring received by the transport device when the transport device is moved from the first position to the second position. The retaining member 10 may be selectively retracted into the transport device, or otherwise displaced relative to the transport device, of the apparatus 9 to release a spring when the transport device is located in proximity to the pocketing station 11.

The pocketing station 11 may comprise a fabric guide 12 along which a band of pocket material 23 may be guided. The fabric guide 12 may be configured to fold the band of pocket material 23. The pocketing station 11 may include a cassette 13 for inserting springs 22 released by the apparatus 9 into a tube 24 of pocket material which is formed from the band 23 of pocket material. The pocketing station 11 may comprise an ultrasonic welding unit 14 for forming a transverse seam between respectively two adjacent pockets. The pocketing station may comprise a further ultrasonic welding unit (not shown in FIG. 1) for forming a longitudinal seam.

Operation of the spring coiler 3, of a drive mechanism 21 of the cooling wheel 6, of a drive mechanism of the apparatus 9 for transporting springs and/or of the pocketing station 11 may be controlled by a control unit 20. For illustration, the control unit 20 may control power supplied to the cooling wheel 6 to cause the cooling wheel 6 to perform a rotational motion 27. The control unit 20 may activate a drive mechanism of the apparatus 9 for transporting springs between the cooling wheel 6 and the pocketing station 11, which may cause the transport device of the apparatus 9 to perform a reciprocating motion.

In the machine 1, the cooling wheel 6 may be a transport device of a first apparatus for transporting springs according to an embodiment. The apparatus 9 may be configured as a second apparatus for transporting springs according to an embodiment. As will be explained in more detail with reference to FIG. 2 to FIG. 23, an apparatus for transporting springs according to an embodiment comprises a transport device which is displaceable to transport springs. The apparatus according to an embodiment includes at least one retaining member 7 including a magnetic material 8, 10 supported on the transport device. The at least one retaining member 7 retains a spring by magnetic force. The apparatus according to an embodiment includes a release mechanism which selectively causes the retaining member and the transport device to be displaced relative to each other, thereby forming and/or increasing a gap between the magnetic material and the spring. This releases the spring. The release mechanism may be configured to cause the magnetic material of the at least one retaining member to be retracted from the spring received by the transport device.

As will be explained in more detail with reference to FIG. 2 to FIG. 23, in some embodiments, the release mechanism may comprise or may be constituted by a release member. The release member may be passive. The release member may be a stationary element which maintains its position relative to the frame 2 on which the apparatus for transporting springs is supported.

The at least one retaining member may come into engagement with the release member as the transport device approaches the second position where a spring is to be released. The release member may prevent a further motion of the retaining member, while allowing the transport device to continue its motion, thereby causing a relative displacement which retracts the magnetic material from the spring, thereby releasing the spring.

In further implementations, the at least one retaining member may come into engagement with the release member as the transport device approaches the second position and may cause the retaining member to pivot. The pivoting displacement between the at least one retaining member and the transport device on which it is supported enlarges a gap between the magnetic material and the spring, thereby releasing the spring.

Figure 2:
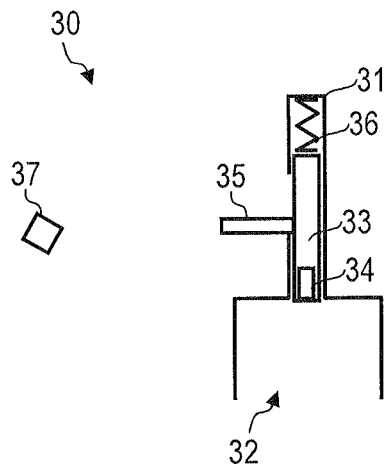
FIG. 2 shows a side view of an apparatus according to an embodiment.

FIG. 2 illustrates an apparatus 30 for transporting springs according to an embodiment. The apparatus 30 may be used for transporting springs to a pocketing station of a machine for forming a string of pocket springs, for example. For illustration, the apparatus 9 of FIG. 1 may have the configuration of the apparatus 30 which will be explained with reference to FIG. 2 to FIG. 5. The apparatus 30 may be used at other locations in the machine 1, e.g. for receiving springs directly from the spring coiler 3.

The apparatus 30 comprises a transport device 31, a retaining mechanism formed by a retaining member 33, and a release mechanism comprising a release member 37. The transport device 31 has a receptacle 32 in which a spring 21 may be received. The receptacle 32 may be configured to support the spring 21 such that the spring 21 abuttingly rests on at least a support surface of the transport device 31 when the spring 21 is received by the transport device 31.

The retaining member 33 has a magnet portion 34 made from a magnetic material. The magnet portion 34 may be formed of or may include a permanent magnet. The magnet portion 34 may extend along a direction which is parallel to a center axis of a spring 21 received in the receptacle 32, i.e., normal to the drawing plane of FIG. 2. The retaining member 33 is operative to retain the spring 21 received in the receptacle 32 by magnetic force. The spring 21 does not need to be a permanent magnet, but may be made of any material which can be attracted by the magnet portion 34. For illustration, the spring 21 may be formed of a wire which consists of or includes a ferromagnetic or paramagnetic material. The spring 21 may, but does not need to be formed of a ferromagnetic material.

The retaining member 33 may be supported on the transport device 31. For illustration, the transport device 31 may have a hollow shaft portion in which at least a part of the retaining member 33 is received. The retaining member 33 may be displaceable relative to the transport device 31. The retaining member 33 may be linearly displaceable along the hollow shaft portion of the transport device 31 in a translatory manner. The translatory displacement of the retaining member 33 relative to the transport device 31 may be delimited by one or several end stops formed on the transport device 31.

The apparatus 30 includes a release member 37 which forms a release mechanism. The release member 37 may be mounted to be stationary relative to a frame of the machine in which the apparatus 30 is installed. As will be explained in more detail with reference to FIG. 5, the release member 37 may be configured for abutting engagement with a portion 35 of the retaining member 33.

The apparatus 30 may comprise a bias mechanism which biases the retaining member 33 into a rest position. The bias mechanism may include a resilient element 36 and/or a bias magnet which biases the retaining member 33 into the rest position. The apparatus 30 includes a bias mechanism which may include a resilient element 36, which may be a spring, for example. The resilient element 36 may act as a bias mechanism which biases the retaining member 33 into a rest position. In the rest position, the magnet portion 34 is arranged in proximity to the spring 21 when the spring 21 is received in the receptacle 32. The magnet portion 34 may be configured such that, in the rest position of the retaining member 33, the spring 21 may directly abut on the magnet portion 34. The magnet portion 34 may be configured such that, in the rest position of the retaining member 33, the spring 21 remains spaced from the magnet portion 34 by a small gap.

Upon engagement of the retaining member 31 with the release member 37, a further motion of the transport device 31 effects a relative displacement between the transport device 31 and the retaining member 33, causing the retaining member 31 to be displaced against a force exerted onto the retaining member 31 by the bias mechanism. For illustration, the resilient element 36 may be caused to be compressed by the relative displacement between the transport device 31 and the retaining member 33.

Figure 3:
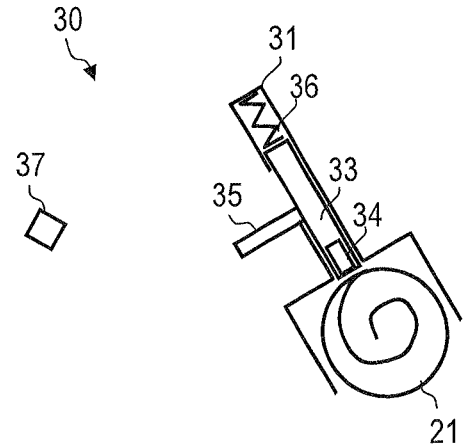
FIG. 3 shows a side view of the apparatus of FIG. 2 when the apparatus receives a spring.
Figure 4:
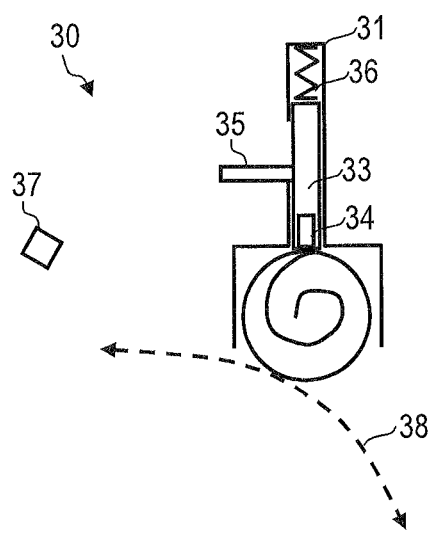
FIG. 4 shows a side view of the apparatus of FIG. 2 when the transport device is being moved.
Figure 5:
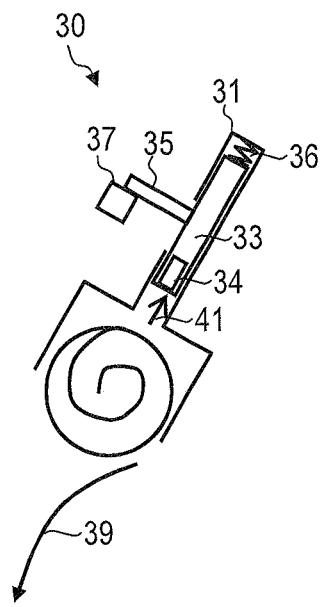
FIG. 5 shows a side view of the apparatus of FIG. 2 when the apparatus releases a spring.

FIG. 3, FIG. 4, and FIG. 5 illustrate the apparatus 30 at various times during one operational cycle, which will be explained in more detail next.

FIG. 3 illustrates the apparatus 30 in a state in which the transport device 31 is located at a first position to receive a spring 21. The retaining member 33 is at its rest position relative to the transport device 31. The transport device 31 and the retaining member 33 supported thereon may be spaced from the release member 37 when the transport device 31 is positioned at the first position to receive the spring 21. The spring 21 may be received such that it abuts on the magnet portion 34. The spring 21 may also remain spaced from the magnet portion 34 by a first gap, which is so small that the magnet portion 34 may still retain the spring 21 by magnetic force.

FIG. 4 illustrates the apparatus 30 in state in which the transport 31 device is moved from the first position to a second position to release the spring. A drive mechanism (not shown in FIG. 4) causes the transport device 31 to move from the first position in which the spring 21 is received to the second position at which the spring is to be released. Different motion paths of the transport device 31 may be implemented. For illustration, the transport device 31 may be linearly displaceable. The drive mechanism may be configured to cause a linear displacement of the transport device 31. In other implementations, the transport device 31 may be pivotably mounted. The drive mechanism may be configured to cause a pivoting motion of the transport device 31. In other implementations, the transport device 31 may be displaceable relative to a pivot axis, thereby allowing the transport device 31 to perform a combined pivoting and translatory motion 38.

FIG. 5 illustrates the apparatus 30 in a state in which the transport device 31 is in proximity to the second position at which the spring 21 is to be released. The retaining member 31 comes into abutting engagement, via its portion 35, with the release member 37. The release member 37 does, however, not block a further motion of the transport device 31. The further motion of the transport device 31 causes the transport device 31 to be linearly displaced relative to the retaining member 33. In a reference frame of the machine in which the apparatus 30 is used, the retaining member 33 remains stationary while the transport device 31 moves linearly relative to the retaining member 33 as the transport device 31 approaches the second position to release the spring. In a reference frame of the transport device 31, the motion of the transport device 31 in combination with release member 37 blocking a further motion of the retaining member 33 causes the retaining member 33 to travel along the hollow shaft of the transport device 31 in which it is received. The bias mechanism may store energy when the retaining member 33 travels relative to the hollow shaft of the transport device 31. For illustration, the resilient element 36 may be compressed and may store energy. When the bias mechanism includes a bias magnet, energy may be stored in the bias mechanism by forming or increasing a gap between the bias magnet and a ferromagnetic or paramagnetic portion of the retaining member 33.

As illustrated in FIG. 5, the motion 39 of the transport device 31 when approaching the second position causes the magnet portion 34 to be retracted from the spring 21 received by the transport device. The retracting motion 41 is schematically illustrated in FIG. 5. The retraction of the magnet portion 34 from the spring 21 forms and/or enlarges a gap between the magnet portion 34 and the spring 21. The resultant decrease in magnetic force applied onto the spring 21 releases the spring.

The drive mechanism of the apparatus 30 may cause the transport device 31 to perform a reciprocating motion. As the transport device 31 is returned to the first position as shown in FIG. 3, the release member 37 disengages the retaining member 33. The bias mechanism, e.g. the resilient element 36 causes the retaining member 33 to return to its rest position relative to the transport device 31, thereby preparing the apparatus 30 for receiving a new spring.

Various modifications may be made to the apparatus 30 explained with reference to FIG. 2 to FIG. 5. For illustration, the apparatus 30 may be configured to simultaneously receive two springs or more than two springs to increase the rate at which springs can be transported.

The retaining member may be supported in a wide variety of different ways on the transport device and/or may be caused to retract from the spring using a wide variety of release mechanisms, as will be explained in more detail with reference to FIG. 6 to FIG. 23.

The bias mechanism may include a bias magnet in addition or as an alternative to the resilient element 36.

Figure 6:
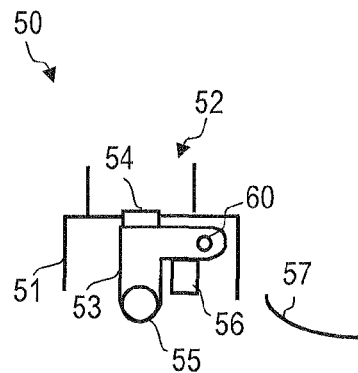
FIG. 6 shows a side view of an apparatus according to another embodiment.

FIG. 6 shows an apparatus 50 for transporting springs according to another embodiment. The apparatus 50 may be used for transporting springs to a pocketing station of a machine for forming a string of pocket springs, for example. The apparatus 50 may be formed on the cooling wheel 6 of the machine 1 of FIG. 1, for example.

The apparatus 50 comprises a transport device 51, a retaining mechanism formed by a retaining member 53, and a release mechanism comprising a release member 57.

The transport device 51 has a receptacle 52 in which a spring 21 may be received. The receptacle 52 may be configured to support the spring 21 such that the spring 21 abuttingly rests on at least on surface of the transport device 51 when the spring 21 is received by the transport device 51.

The retaining member 53 has a magnet portion 54 made from a magnetic material. The magnet portion 54 may be formed of or may include a permanent magnet. The magnet portion 54 may extend along a direction which is parallel to a center axis of a spring 21 received in the receptacle 52, i.e., normal to the drawing plane of FIG. 6. The retaining member 53 is operative to retain the spring 21 received in the receptacle 52 by magnetic force. The spring 21 does not need to be a permanent magnet to be retained by the magnet portion 54. The spring 21 may be formed from a wire made of any material which can be attracted by the magnet portion 54. The spring 21 may have paramagnetic or ferromagnetic characteristics, for example. The spring 21 may, but does not need to be formed of a ferromagnetic material.

The retaining member 53 may be supported on the transport device 51. For illustration, the retaining member 53 may have a pivot axis 60 fixed on the transport device 51. The retaining member 53 may be displaceable relative to the transport device 51. The retaining member 53 may be pivotably displaceable to the transport device 51 about the pivot axis 60.

The apparatus 50 includes a release member 57 which forms a release mechanism. The release member 57 may be mounted to be stationary relative to a frame of the machine in which the apparatus 50 is installed. As will be explained in more detail with reference to FIG. 8 and FIG. 9, the release member 57 may be configured for abutting engagement with a portion 55 of the retaining member 53. The release member 57 may have a curved surface, e.g. a cam surface, along which the portion 55 of the retaining member 53 may slide, thereby causing the retaining member 53 to pivot about the pivot axis 60. The portion 55 may be a roller. The roller may be rotatably mounted to reduce friction between the release member 57 and the retaining member 53 when the portion 55 slides along the release member 57.

The apparatus 50 includes a resilient element 56, which may be a spring, for example. The resilient element 56 acts as a bias mechanism which biases the retaining member 53 into a rest position. In the rest position, the magnet portion 54 is arranged in proximity to the spring 21 when the spring 21 is received in the receptacle 52. The magnet portion 54 may be configured such that, in the rest position of the retaining member 53, the spring 21 may directly abut on the magnet portion 54. Upon engagement of the retaining member 53 with the release member 57, a continuing motion of the transport device 51 effects a relative displacement between the transport device 51 and the retaining member 53, causing the resilient element 56 to be compressed.

Figure 7:
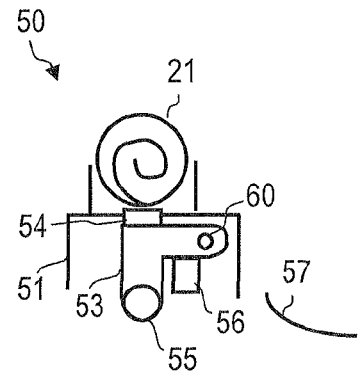
FIG. 7 shows a side view of the apparatus of FIG. 6 when the apparatus receives a spring.
Figure 8:
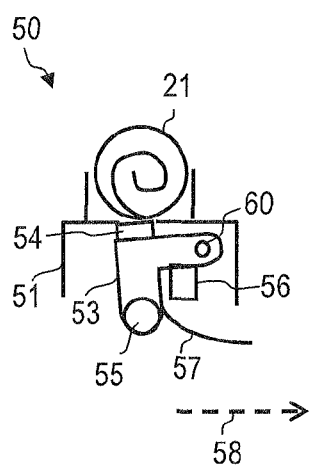
FIG. 8 shows a side view of the apparatus of FIG. 6 when the transport device is being moved.
Figure 9:
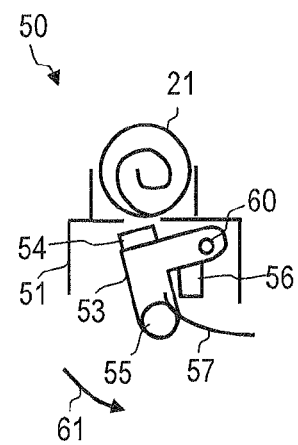
FIG. 9 shows a side view of the apparatus of FIG. 6 when the apparatus releases a spring.

FIG. 7, FIG. 8, and FIG. 9 illustrate the apparatus 50 at various times during one operational cycle, which next be explained in more detail will.

FIG. 7 illustrates the apparatus 50 in a state in which the transport device 51 is located at a first position to receive a spring 21. The retaining member 53 is at its rest position relative to the transport device 51. The transport device 51 and the retaining member 53 supported thereon may be spaced from the release member 57 when the transport device 51 is positioned at the first position to receive the spring 21. The spring 21 may be received such that it abuts on the magnet portion 54. The spring 21 may also remain spaced from the magnet portion 54 by a first gap, which is so small that the magnet portion 54 may still retain the spring 21 by magnetic force.

FIG. 8 illustrates the apparatus 50 in a state in which the transport 51 device is moved from the first position to a second position to release the spring. A drive mechanism (not shown in FIG. 8) causes the transport device 51 to move from the first position in which the spring 21 is received to the second position at which the spring is to be released. Different motion paths of the transport device 51 may be implemented. For illustration, the transport device 51 may be linearly displaceable. The drive mechanism may be configured to cause a translatory motion 58 of the transport device 51. In other implementations, the transport device 51 may be rotatably or pivotably mounted. The drive mechanism may be configured to cause a rotating or pivoting motion of the transport device 51. The motion 58 of the transport device 51 brings the portion 55 into abutting engagement with a cam surface of the release member 57. The portion 55, which may be formed as a roller, is forced to slide along the cam surface, thereby pushing the roller portion 55 in a downward direction in FIG. 8. This causes the retaining member 53 to pivot about the pivot axis 60.

The release member 57 and the roller portion 55 may be offset, in a direction normal to the drawing plane of FIG. 8, from the plane in which other portions of the retaining member 53 extend. This prevents the release member 57 from interfering with the pivoting motion of the retaining member 53.

FIG. 9 illustrates the apparatus 50 in a state in which the transport device 51 is at the second position at which the spring 21 is released. The retaining member 51 is still in abutting engagement, via its portion 55, with the release member 57. The release member 57 does not block a motion of the transport device 51, while forcing the portion 55 to travel along the release member 57. This causes the retaining member 53 to perform a pivoting motion 61 relative to the transport device 51. In a reference frame of the machine in which the apparatus 50 is used, the retaining member 53 both pivots about the axis 60 and moves with the transport device 51 as the transport device 51 approaches the second position to release the spring. In a reference frame of the transport device 51, the motion of the transport device 51 in combination with the force exerted onto the retaining member 53 by the release member 57 causes the retaining member 53 to pivot about the axis 60. The resilient element 56 is compressed and stores energy.

As illustrated in FIG. 9, the motion of the transport device 51 when approaching the second position causes the magnet portion 54 to be retracted from the spring 21 received by the transport device 51. The retraction of the magnet portion 54 from the spring 21 forms and/or enlarges a gap between the magnet portion 54 and the spring 21. The resultant decrease in magnetic force applied onto the spring 21 releases the spring 21.

The drive mechanism of the apparatus 50 may cause the transport device 51 to perform a reciprocating motion, for example. As the transport device 51 is returned to the first position as shown in FIG. 6, the release member 57 disengages the portion 55 of the retaining member 53. The resilient element 56 causes the retaining member 53 to return to its rest position, thereby preparing the apparatus 50 for receiving a new spring.

In another implementation, the drive mechanism of the apparatus 50 may cause the transport device 51 to perform a motion in one direction only, e.g. a continuous or intermittent rotation in the same direction of rotation, as will be explained in more detail with reference to FIG. 10 to FIG. 18. In this case, continued motion of the transport device 51 may cause the release member 57 to automatically disengage the retaining member 53. The resilient element 56 causes the retaining member 53 to return to its rest position, thereby preparing the apparatus 50 for receiving a new spring.

Figure 10:
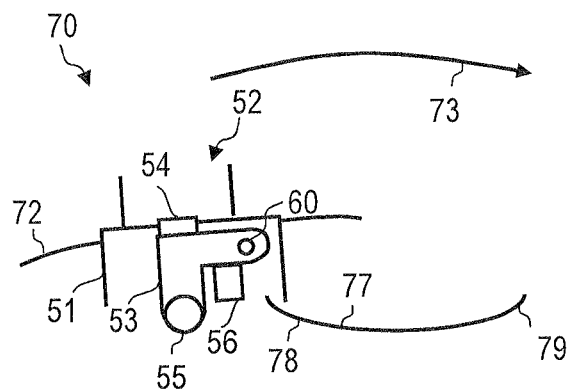
FIG. 10 shows a side view of an apparatus according to another embodiment.

FIG. 10 shows an apparatus 70 for transporting springs according to another embodiment. The apparatus 70 may be used for transporting springs to a pocketing station of a machine for forming a string of pocket springs, for example. The apparatus 70 may be formed on a cooling wheel 6 of the machine 1 of FIG. 1, for example.

The apparatus 70 comprises a transport device 51, a retaining member 53, and a release mechanism comprising a release member 77. The transport device 51 and retaining member 53 supported on the transport device 51 may be configured as explained with reference to FIG. 6 to FIG. 9. The transport device 51 may be arranged on a transport wheel 72, such as cooling wheel 6, for example. The transport wheel 72 and the transport device 51 may be rotated in a direction 73 about a rotation shaft 71. The rotation may be consistently performed in the direction 73, without any reversal during ongoing operation of the machine.

The release member 77 has a first cam surface 78 and a second cam surface 79. When the portion 55 of the retaining member 53 comes into abutment with the cam surface 79, the cam surface 79 forces the portion 55 to travel along the first cam surface 78. This causes the retaining member 53 to pivot, which retracts the magnet portion 54 into the transport device 51. When the portion 55 of the retaining member 53 has travelled along the first cam surface 78 and begins to travel along the second cam surface 79, the retaining member 53 is allowed to pivot back to its rest position. The magnet portion 54 is again positioned at a boundary of or even within the receptacle 52 to retain a new spring.

Figure 11:
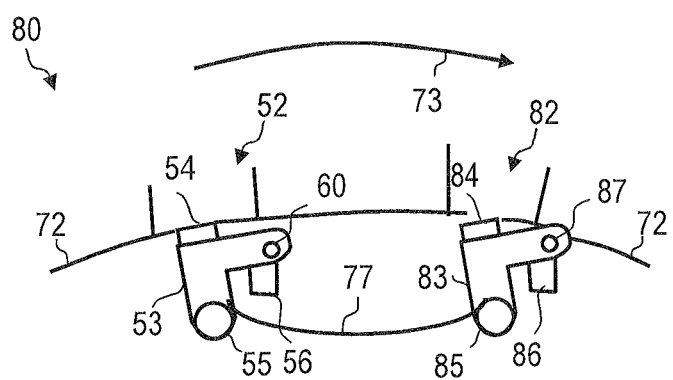
FIG. 11 shows a side view of an apparatus according to another embodiment.

FIG. 11 shows an apparatus 80 for transporting springs according to another embodiment. The apparatus 80 may be used for transporting springs to a pocketing station of a machine for forming a string of pocket springs, for example. The apparatus 80 may be used in a cooling wheel 6 of the machine 1 of FIG. 1, for example.

The apparatus 70 comprises a transport wheel 72, which may be a cooling wheel, for example. The transport wheel 72 acts as a transport device. The transport wheel 72 is rotatable about a rotation shaft 71. The transport wheel 72 defines a receptacle 52 and at least one further receptacle 82, which are respectively configured to receive a spring.

The apparatus 80 has a retaining member 53 provided with a magnet portion 54. Engagement of a roller portion 55 of the retaining member 53 with a first cam surface of the retaining member 77 causes the retaining member 53 to pivot. This retracts the magnet portion 54 from the receptacle 52, allowing the spring to be released. Energy is stored in a resilient element 56 as the retaining member 53 pivots about its pivot axis 60 relative to the transport wheel 72. Continued rotation of the transport wheel 72 in a direction 73 causes the roller portion 55 to travel along a second cam surface of the release member 77. The retaining member 53 is allowed to pivot back to its rest position under the action of the resilient element 56. The magnet portion 54 is thereby again positioned at a boundary of or even within the receptacle 52 to retain a new spring.

Similarly, the apparatus 80 has at least one further retaining member 83 provided with a magnet portion 84 to retain a further spring received in the further receptacle 82. Engagement of a roller portion 85 of the further retaining member 83 with the first cam surface of the retaining member 77 causes the further retaining member 83 to pivot. This retracts the magnet portion 84 from the further receptacle 82, allowing the further spring to be released. Energy is stored in a resilient element 86 as the further retaining member 83 pivots about its pivot axis 87 relative to the transport wheel 72. Continued rotation in a direction 73 causes the roller portion 85 to travel along the second cam surface of the release member 77, which is the state illustrated in FIG. 11. The further retaining member 83 is allowed to pivot back to its rest position under the action of the resilient element 86. The magnet portion 84 is thereby again positioned at a boundary of or even within the further receptacle 82 to retain a new spring.

More than two retaining members with integral magnet portion may be provided on the wheel 72. This allows springs to be continuously transported towards the position at which the release member 77 engages a retaining member and causes the retaining member to pivot, thereby retracting the magnet portion away from the spring to release the spring.

One apparatus for transporting springs, two apparatuses for transporting springs, or even more than two apparatuses for transporting springs configured as disclosed herein may be used in one machine which forms at least a portion of an innerspring unit. For illustration, and as will be explained in more detail with reference to FIG. 12 to FIG. 20, a first apparatus for transporting springs may be provided to securely retain springs transported by the cooling wheel of the machine. The cooling wheel may act as transport device of the first apparatus for transporting springs. A second apparatus for transporting springs may be provided to transport springs from the cooling wheel to a downstream station, e.g. a pocketing station or a setting station in which the springs are received.

Figure 12:
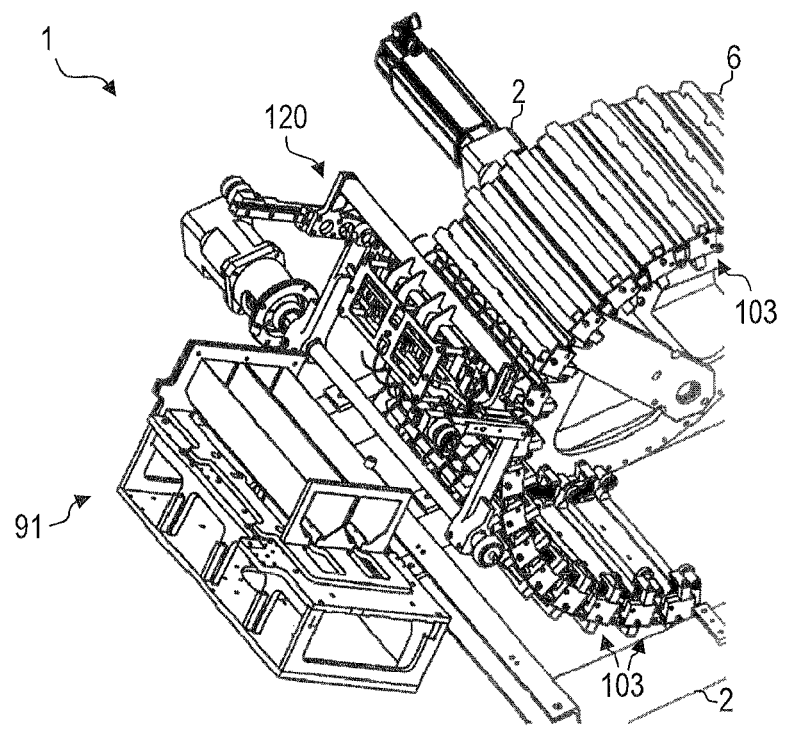
FIG. 12 shows a perspective view of a machine according to an embodiment, when a second apparatus for transporting springs from a cooling wheel to a pocketing station is positioned to receive springs from the cooling wheel.
Figure 13:
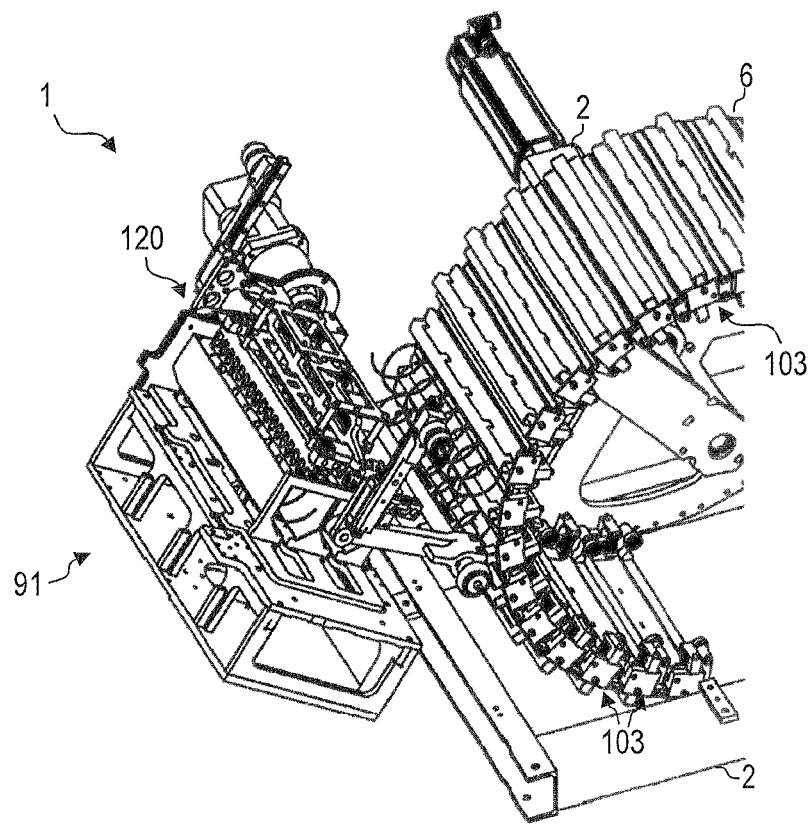
FIG. 13 shows a perspective view of the machine of FIG. 12 when the second apparatus is positioned to release springs to a pocketing station.

FIG. 12 and FIG. 13 are perspective views of a machine 1 according to an embodiment. The machine 1 may be a machine for producing a string of pocket springs. The machine 1 may be a machine for producing a string of pocket springs for use in an innerspring unit of a seating or bedding furniture.

The machine 1 includes a transport wheel which may be configured as a cooling wheel 6. The cooling wheel 6 is configured to receive springs formed by a spring coiler 3. The cooling wheel 6 is mounted so as to be rotatable relative to a frame 2 of the machine.

A plurality of retaining members 103 are attached to the cooling wheel, each of which has a magnet portion which comprises or consists of a permanent magnet. As will be explained in more detail with reference to FIG. 14 to FIG. 18, a release member 107 which is stationary relative to the frame 2 selectively engages a portion of a retraining member 103 when the cooling wheel 6 is rotated to a position at which the retaining member 103 mechanically contacts the release member 107. The release member 107 may have at least one cam surface to cause the retaining member 103 to pivot relative to the cooling wheel 6, similarly to the operation described for the embodiments of FIG. 6 to FIG. 11. The cooling wheel 6, the retaining members 103 provided thereon and the release member 107 form a first apparatus for transporting springs. The apparatus is configured to selectively release springs at release positions at which they are received by a second apparatus 120 for transporting springs.

The machine 1 comprises the second apparatus 120 for transporting springs. The second apparatus 120 may be configured to transport springs from the cooling wheel 6 to a station 91. The station 91 may be a setting station or another part of a station for pocketing springs, for example. As will be explained in more detail with reference to FIG. 14 to FIG. 17, FIG. 19, and FIG. 20, the second apparatus 120 for transporting springs has a transfer device which is configured to simultaneously receive two springs. The second apparatus 120 includes a first retaining member 123 having a first magnet portion 124 formed from a permanent magnet. The first retaining member 123 may be selectively displaced relative to the transport device, e.g. in a translatory manner, when a release member 127 engages a retaining mechanism which includes the first retaining member 123.

Referring now to FIG. 14 to FIG. 18, the configuration and operation of the first apparatus for transporting springs is explained in more detail. The first apparatus for transporting springs includes a transport wheel, which may be the cooling wheel 6, as a transport device. The cooling wheel 6 may have a plurality of receptacles for receiving and, optionally, mechanically supporting springs.

Figure 18:
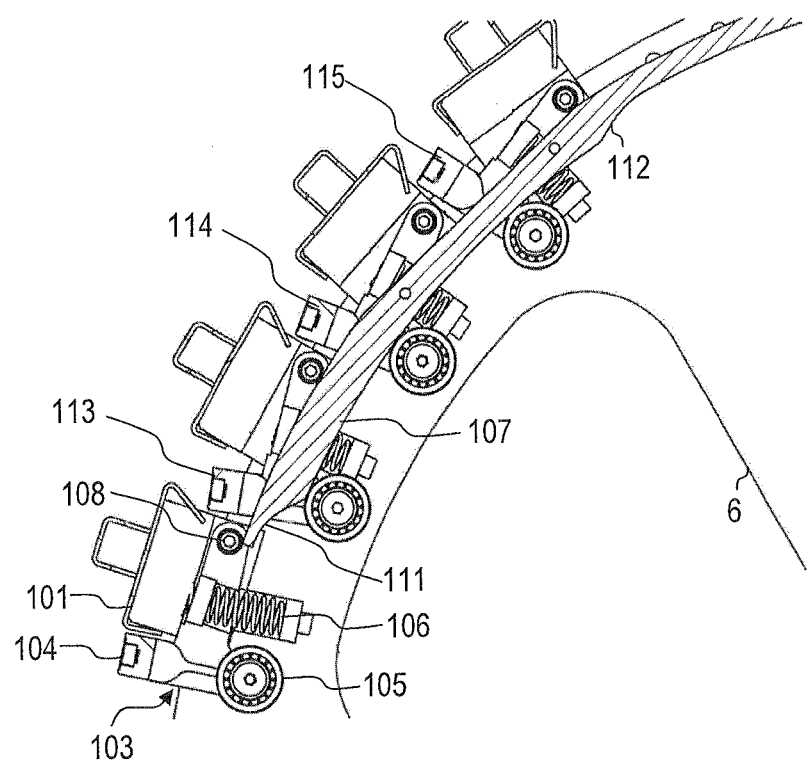
FIG. 18 is a cross-sectional view of a first apparatus for transporting springs according to an embodiment which may be used in the machine of FIG. 12.

The first apparatus for transporting springs comprises a plurality of pivotable retaining members 103. Each pivotable retaining member 103 may respectively be arranged adjacent to one of the receptacles at which the cooling wheel 6 may receive a spring. Each pivotable retaining member 103 comprises a magnet portion 104. Each pivotable retaining member 103 is biased into a rest position by a resilient element 106, which may be configured as a spring. When the retaining member 103 is in the rest position relative to the cooling wheel 6, the magnet portion 104 may be located in proximity to a receptacle in which a spring may be received to retain a spring by magnetic force. As best seen in FIG. 18, each pivotable retaining member 103 may have a roller portion 105 for engagement with a release member 107.

As best seen in FIG. 18, the first apparatus for transporting springs comprises the release member 107. The release member 107 may be stationary relative to the frame 2. The release member 107 may have a first cam portion 111. The release member 107 may have a second cam portion 112.

When the roller portion 105 of a retaining member 103 engages the first cam portion 111 a further rotation of the cooling wheel 6 causes the roller portion 105 to travel along the first cam portion 111. The first cam portion 111 of the release member 107 causes the retaining member 103 to pivot about a pivot axis 108 relative to the cooling wheel 6. The resilient element 108 is compressed and energy is stored in the resilient element 108. As best seen in FIG. 18, the pivoting motion of the retaining member 113 relative to the cooling wheel 6 causes the magnet portion of the retaining member 113 to be retracted. The magnetic force applied onto a spring received in the associated receptacle of the cooling wheel decreases, thereby releasing the spring.

The release member 107 may be configured such that more than one retaining member is simultaneously maintained in a pivoted state, with the magnet portion 104 provided on the retaining member being retracted into the cooling wheel 6. Such a configuration may be beneficial to ensure that two or more than two springs are simultaneously released. For illustration, two or more than two springs may be simultaneously removed from the cooling wheel and may be transported to a downstream processing station in the machine 1. For illustration, as shown in FIG. 18, the retaining levers 113-115 may be simultaneously maintained in the pivoted stated in which the magnet portion of the retaining levers 113-115 is retracted.

When the roller portion 105 of a retaining lever 103, 113-115 travels along the second cam surface 112 the retaining lever is allowed to pivot back towards its rest position. The resilient element 106 provides the required force for pivoting the retaining lever back to its rest position relative to the cooling wheel about the pivot axis 108. The retaining lever is then positioned to retain another spring received on the cooling wheel.

Referring now to FIG. 14 to FIG. 17, FIG. 19, and FIG. 20, the configuration and operation of the second apparatus 120 for transporting springs is explained in more detail. The second apparatus 120 for transporting springs may be configured to directly receive springs from the cooling wheel 6 and to transport the springs to a setting station 91 or to another component of a pocketing station.

Figure 19:
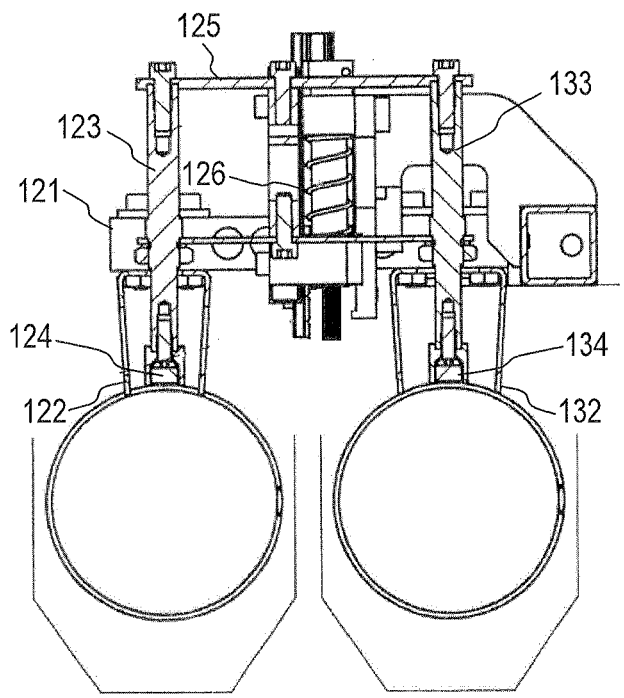
FIG. 19 is a cross-sectional view of a second apparatus for transporting springs according to an embodiment which may be used in the machine of FIG. 12.
Figure 20:
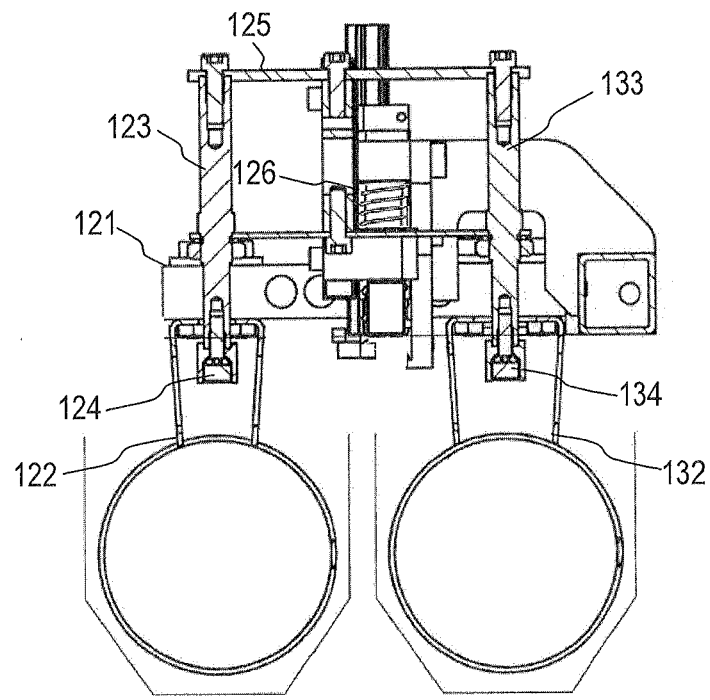
FIG. 20 is a cross-sectional view of the second apparatus for transporting springs according to an embodiment which may be used in the machine of FIG. 12 when springs are released.

The second apparatus 120 includes a transport device 121 which is mounted to be displaceable relative to the frame 2 of the machine 1. The transport device 121 is configured to receive a spring and may be configured to receive more than one spring. For illustration, as best seen in FIG. 19 and FIG. 20, the transport device 121 may have a first support surface 122 on which a first spring may be received. The transport device 121 may have a second support surface 132 on which a second spring may be received and retained simultaneously with the first spring retained on the first projection 121.

The second apparatus 120 includes a retaining mechanism which is mounted on the transport device 121 and which is displaceable relative to the transport device 121. The retaining mechanism includes a first retaining member 123. A first magnet portion 124 is disposed at an end of the first retaining member 123. The retaining mechanism includes a second retaining member 133. A second magnet portion 134 is disposed at an end of the second retaining member 133. The first magnet portion 124 is configured to abut on the first spring received on the first support surface 122 to retain the first spring by magnetic force. The second magnet portion 134 is configured to abut on the second spring received on the second support surface 132 to retain the second spring by magnetic force.

The first retaining member 123 may include a body which extends through and is slidable in a hollow shaft portion of the transport device 121. The second retaining member 133 may include a body which extends through and is slidable in another hollow shaft portion of the transport device 121. The first retaining member 123 and the second retaining member 133 may be rigidly connected to each other, e.g. by a cross member 125, to form an integral retaining mechanism which is configured to simultaneously retain the first spring and the second spring on the transport device 121. The retaining mechanism is displaceable relative to the transport device 121 in a translatory manner.

A resilient element 126, which may be a spring, may be interposed between the transport device 121 and the retaining mechanism. Alternatively or additionally to the resilient element 126, a bias mechanism which biases the retaining mechanism to a rest state may comprise a bias magnet, as will be explained in more detail with reference to FIG. 21 to FIG. 23. The resilient element 126 may bias the retaining mechanism to a state relative to the transport device 121 as shown in FIG. 19, in which the first magnet portion 124 and the second magnet portion 134 are respectively configured to contact a spring positioned on the transport device 121.

The second apparatus 120 comprises a release member 127. The release member 127 may be positioned so as to be stationary relative to the frame 2. The release member 127 may be spaced from the transport device 121 and the retaining mechanism supported thereon when the transport device 121 is positioned at a first position close to the cooling wheel 6 to receive springs. The release member 127 may selectively engage the retaining mechanism when the transport device 121 is moved from the first position in which springs are received towards a second position in which springs are released. For illustration, the release member 127 may be configured to block a further motion of the retaining mechanism relative to the frame 2 when the transport device 120 approaches the second position to release springs. The release member 127 may be configured such that it does not prevent the transport device 121 from moving further towards the second position. The action of the release member 127, in combination with the motion of the transport device 121 into the second position, causes the transport device 121 to be displaced in a linear manner relative to the retaining mechanism when the release member 127 engages the retaining mechanism. When seen from the reference frame of the transport device 121, the engagement of the release member 127 and the retaining mechanism causes the retaining mechanism to be displaced relative to the transport device, such that the first magnet portion 124 and the second magnet portion 134 are retracted from the first support surface 122 and the second support surface 132, respectively.

FIG. 19 shows a cross-sectional view of the transport device 121 and retaining mechanism when the transport device 121 approaches the second position and the release member (not shown in FIG. 19) comes into abutment with the retaining mechanism. The first magnet portion 124 and the second magnet portion 134 are still in their rest position relative to the transport device 121, thereby retaining the springs received on the transport device 121.

FIG. 20 shows a cross-sectional view of the transport device 121 and retaining mechanism when the transport device 121 has reached the second position. The release member (not shown in FIG. 19) prevents a further motion of the retaining mechanism relative to the frame 2 of the machine 1. The transport device 121 has moved to the second position, causing the first support surface 122 and the second support surface 132 to be displaced relative to the first magnet portion 124 and the second magnet portion 134, respectively. The first magnet portion 124 and the second magnet portion 134 are retracted relative to the first support surface 122 and the second support surface 132, respectively. The gap between the first magnet portion 124 and the associated spring and the gap between the second magnet portion 134 and the associated spring are enlarged, causing the magnetic force applied onto the springs to decrease. The springs are released.

The transport device 121 may undergo a reciprocating motion between the first position at which springs are received from the cooling wheel 6 and the second position at which springs are released. A drive mechanism may be provided for moving the transport device 121 between the first position and the second position, and vice versa. The drive mechanism may be implemented such that the transport device 121 performs a combined pivoting motion and translatory motion.

The drive mechanism may include a first arm 141 and a second arm 142. An end of the second arm 142 may be pivotably coupled to the transport device 121 at the pivot connection 145. The pivot connection 145 may be configured to travel along the first arm 142. For illustration, the pivot connection 145 may include a projection at an end of the second arm 142 extending into a mating recess of the transport device 121, and the transport device 121 may have a guide feature for sliding along the first arm 141. The second arm 142 may be pivotable about an axis defined by a drive shaft 143. A power drive (not shown) may drive the drive shaft 143 to cause the second arm 142 to pivot. The first arm 141 may be pivotable about another axis defined by another shaft 144. The other shaft 144 may be parallel to the drive shaft 143.

The transport device 121 may be attached to the first arm 141 of the drive mechanism. The transport device 121 may be attached to the first arm 141 of the drive mechanism such that the orientation of the first arm 141 defines the orientation of the transport device 121.

The transport device may additionally be attached to the second arm 142 of the drive mechanism by the pivot connection 145. The transport device 121 may be attached to the second arm 142 of the drive mechanism such that a position of the end of the second arm 142 which is opposed to the drive shaft 143 determines the position of the transport device 121 along the first arm 141.

Figure 14:
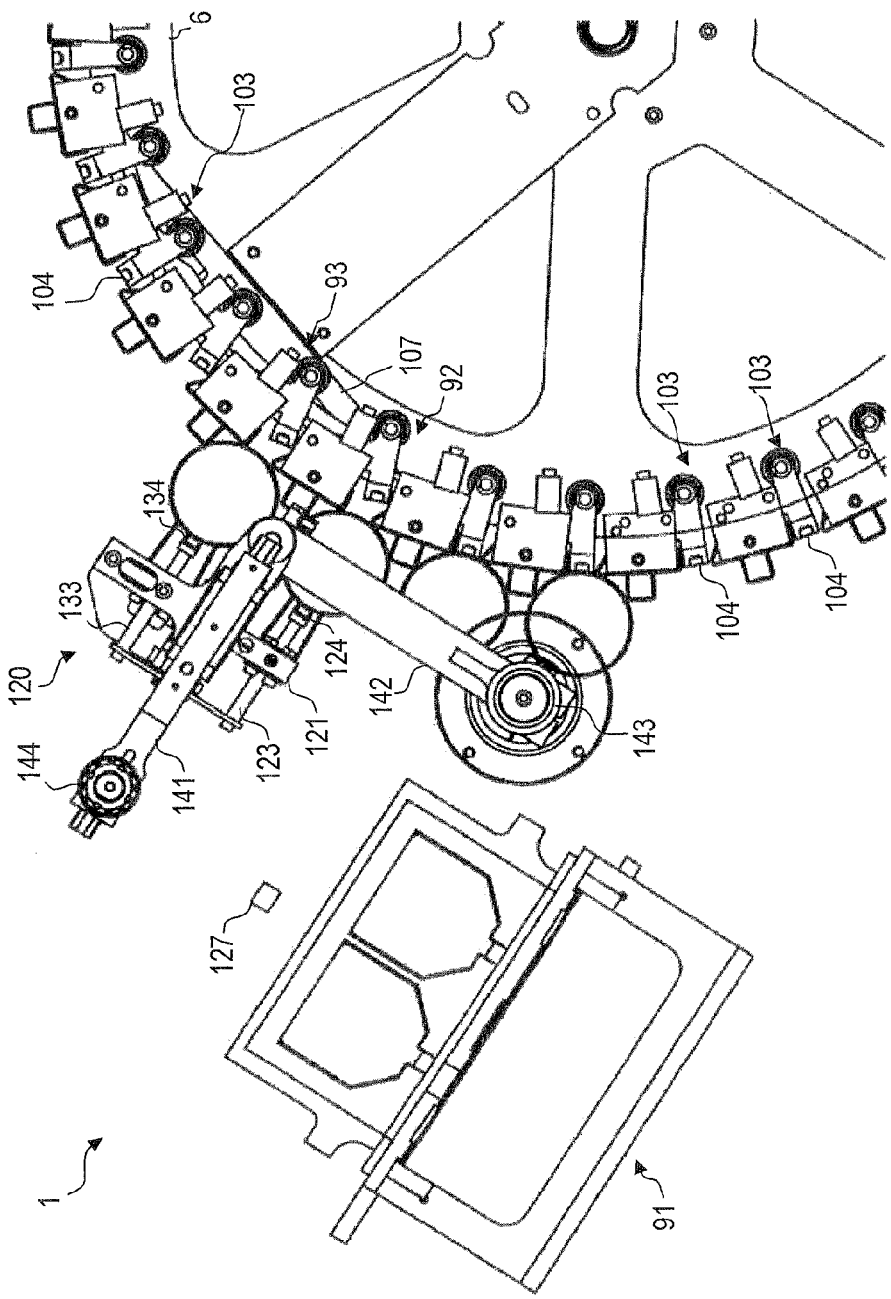
FIG. 14 shows a partial side view of the machine of FIG. 12.

Operation of the drive mechanism of the second apparatus 120 will be explained in more detail with reference to FIG. 14 to FIG. 18. FIG. 14 shows the second apparatus 120 in a state in which the transport device 121 is positioned to receive springs at locations 92, 93 on the cooling wheel 6. The retaining members 103 of the first apparatus for transporting springs are pivoted at the locations 92, 93 to allow the springs to be easily removed from the cooling wheel 6.

As best seen in FIG. 14, the first arm 141 may be arranged to be approximately perpendicular to the second arm 142 when the transport device 121 is located at the first position to receive springs. The first arm 141 may be arranged to point approximately radially towards a rotation shaft of the cooling wheel 6 when the transport device 121 is located at the first position to receive springs. This allows the springs to be removed from the cooling wheel 6 in an approximately radial direction, thereby rapidly increasing the distance between the springs and the magnet portions of the retaining members 103.

Figure 15:
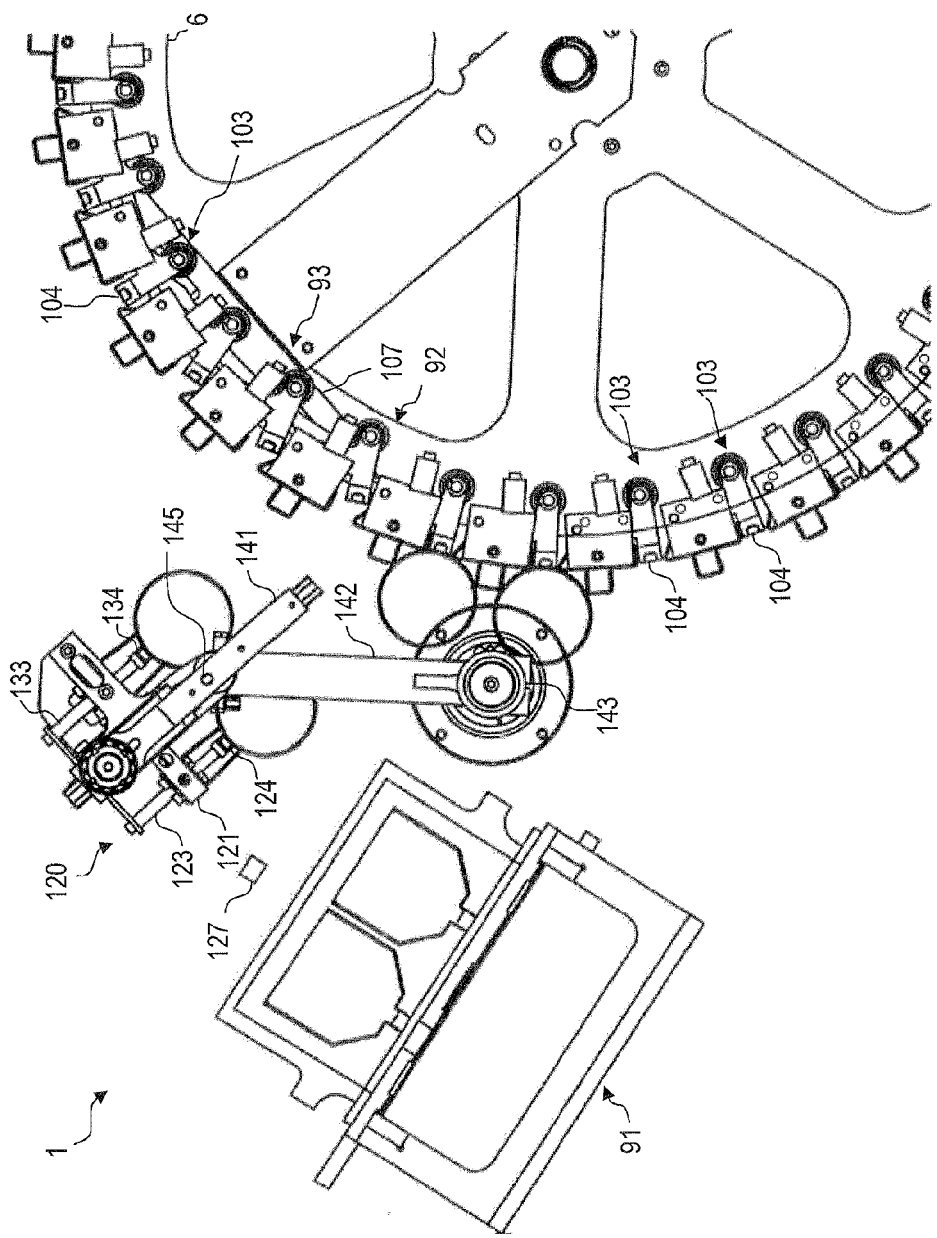
FIG. 15 shows a partial side view of the machine of FIG. 12 at another time to illustrate operation of a first apparatus for transporting springs and of the second apparatus for transporting springs.

The drive shaft 143 is driven to rotate the second arm 142. This causes both the first arm 141 and the second arm 142 to pivot. The end of the second arm 142 opposed to the drive shaft 143 travels along the first arm 141. This causes the transport device 121 and the retaining mechanism to also travel along the first arm 141, as illustrated in FIG. 15.

Figure 16:
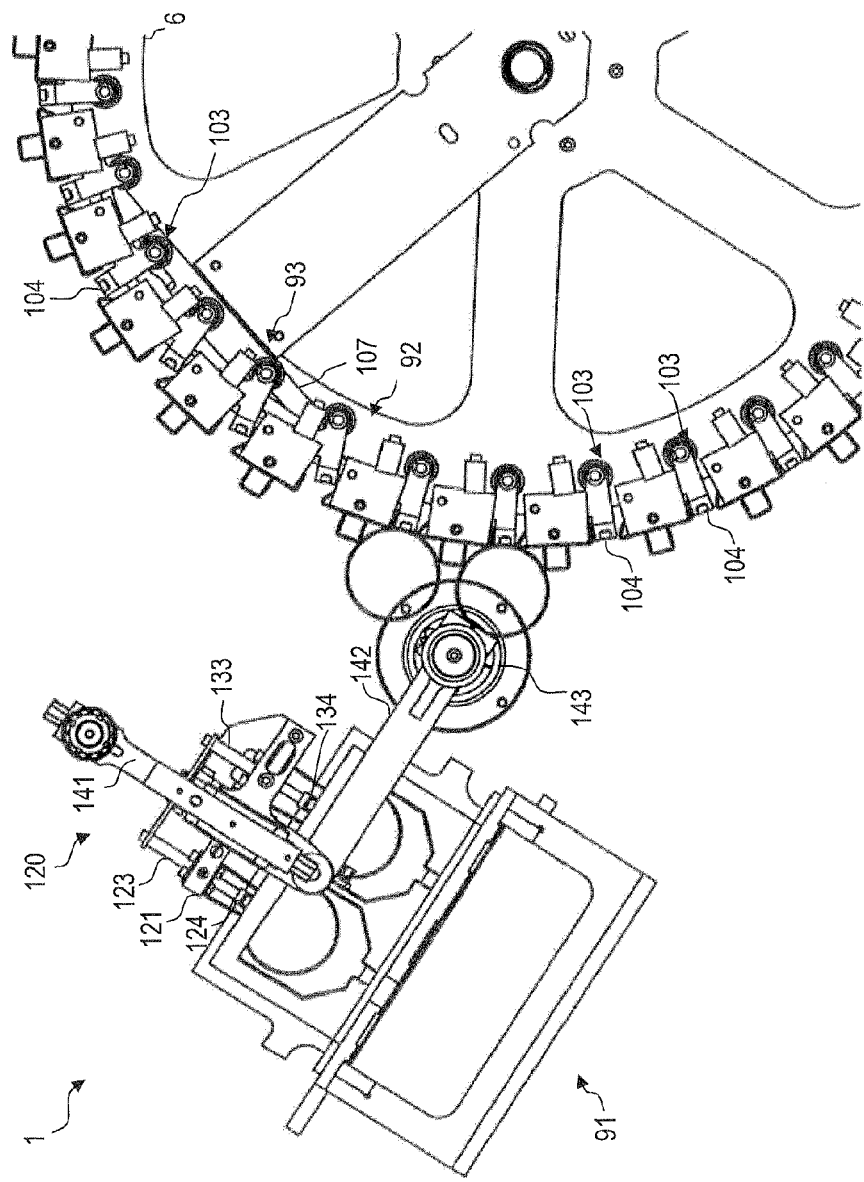
FIG. 16 shows a partial side view of the machine of FIG. 12 at yet another time.

FIG. 16 shows a state in which the release member 127 comes into abutting engagement with the retaining mechanism. In this state, the first retaining member 123 and the second retaining member 133 may still be in their rest state relative to the transport device 121. The first magnet portion 124 may abut on the first spring and the second magnet portion 134 may abut on the second spring to thereby retain the springs on the transport device 121.

The first arm 141 may be arranged to be approximately perpendicular to the second arm 142 when the transport device 121 is located such that the release member 127 comes into abutting engagement with the retaining mechanism. This allows the transport device 121 and the retaining mechanism to be displaced relative to each other in an essentially linear translatory manner when the second arm 142 is rotated further.

Figure 17:
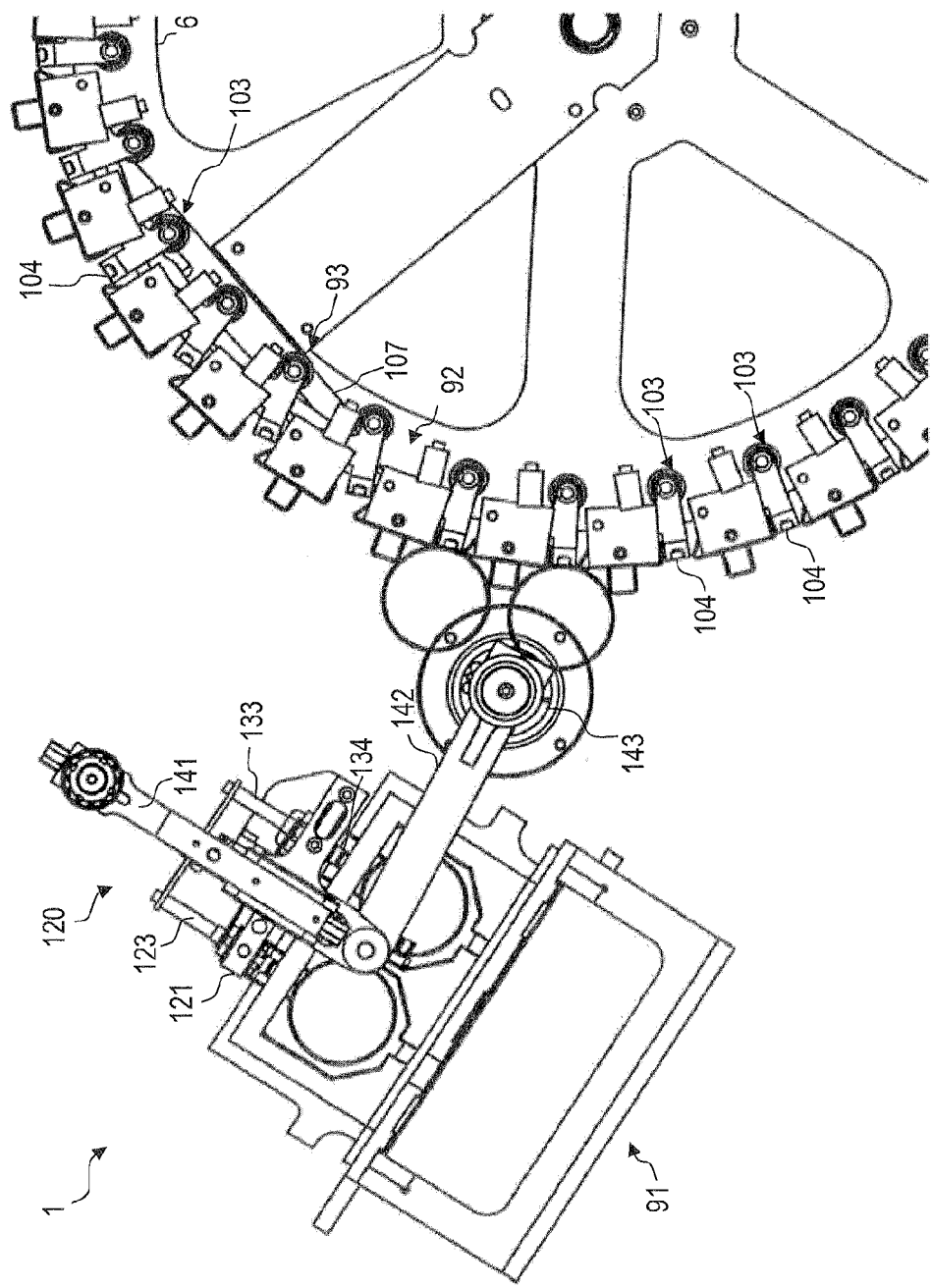
FIG. 17 shows a partial side view of the machine of FIG. 12 at yet another time.

FIG. 17 shows a state in which the release member 127 prevents the retaining mechanism from moving jointly with the transport device 121. Rotation of the second arm 142 causes the transport device 121 to travel along the first arm 141, thereby linearly displacing the transport device 121 relative to the retaining mechanism which is kept stationary by the release member 127. The gap between the first magnet portion 124 and the first spring and the gap between the second magnet portion 134 and the second spring is enlarged. This releases the first spring and the second spring.

When the drive shaft 143 is rotated backward, the retaining mechanism is automatically disengaged from the release member 127. The resilient element 126 pushes the retaining mechanism back into its rest position relative to the transport device 121, preparing the second apparatus 120 for receiving and retaining two new springs.

Various modifications may be implemented in an apparatus and method according to further embodiments. For illustration, the bias mechanism which biases the retaining mechanism into a rest position relative to the transport device may take any one of a variety of forms. The bias mechanism may include a resilient element. Alternatively or additionally, the bias mechanism may have various other configurations. The bias mechanism may include a bias magnet in addition or as an alternative to a resilient element, for example, as will be explained in more detail with reference to FIG. 21 to FIG. 23.

Figure 21:
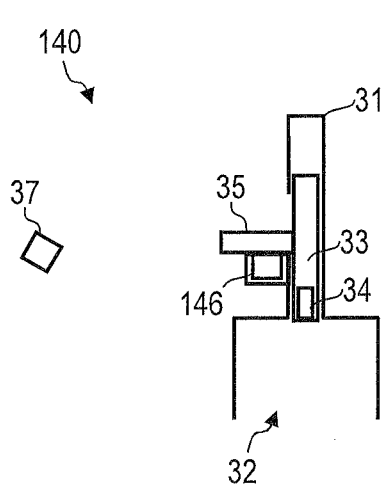
FIG. 21 shows a side view of an apparatus according to another embodiment.
Figure 22:
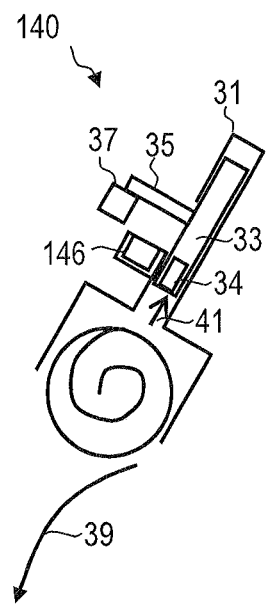
FIG. 22 shows a side view of the apparatus of FIG. 21 when the apparatus releases a spring.

FIG. 21 shows a side view of an apparatus 140 according to an embodiment, and FIG. 22 shows a side view of the apparatus 140 when a spring 21 is released.

The apparatus 140 generally has a configuration similar to the apparatus 30 explained with reference to FIG. 2 to FIG. 5. A bias mechanism which biases the retaining member 33 into a rest position relative to the transport device 31 includes a bias magnet 146. The bias magnet 146 may be a permanent magnet or may be an electromagnet. The bias magnet 146 may be affixed at the transport device 31. The bias magnet 146 magnetically acts onto a portion 35 of the retaining member 33. The portion 35 may be made or may comprise a ferromagnetic or paramagnetic material, for example. The bias magnet 146 may exert an attractive force onto the portion 35 of the retaining member 33. When a relative displacement between the retaining member 33 and the transport device 31 is effected, a distance between the portion 35 and the bias magnet 146 is increased, as illustrated in FIG. 22.

A configuration in which a bias mechanism which biases the retaining mechanism into a rest configuration relative to the transport device uses magnetic attractive forces can be particularly suitable to securely hold the retaining mechanism in the rest position, even when the transport device experiences a great acceleration. This allows the movement speeds and accelerations of the transport device to be increased while securely retaining, thereby decreasing cycle times.

Figure 23:
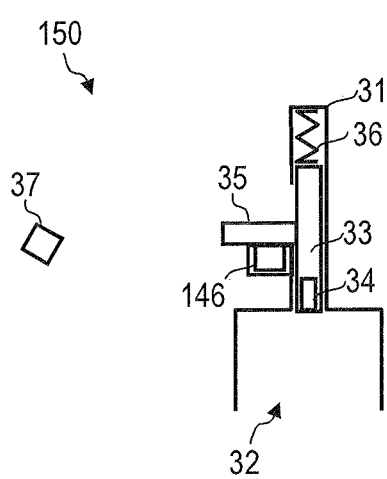
FIG. 23 shows a side view of an apparatus according to another embodiment.

FIG. 23 is a side view of an apparatus 150 according to another embodiment. The apparatus 150 includes a bias mechanism which comprises both a bias magnet 146 and a resilient element 36. The resilient element 36 is operative to displace the portion 35 upon which the bias magnet 46 acts towards the bias magnet. This ensures that the apparatus returns to its rest position more rapidly.

Configurations in which a bias mechanism includes a bias magnet in addition or as an alternative to a resilient element, as explained with reference to FIG. 21 to FIG. 23, may be used in the apparatus of any one of the embodiments disclosed herein.

While embodiments of the invention have been described with reference to the drawings, a wide variety of modifications may be implemented in other embodiments. For illustration, a machine configured to form at least a portion of an innerspring unit for seating and/or bedding furniture may include one apparatus for transporting springs according to an embodiment, two apparatuses for transporting springs according to an embodiment, or more than two apparatuses for transporting springs according to an embodiment.

While embodiments have been described in which a release mechanism is configured as a passive unit which uses engagement between a stationary release member and a retaining mechanism to mechanically retract a magnetic material away from a spring, other implementations of the release mechanism may be used. The release mechanism may include a power drive which is selectively activated to displace the retaining member relative to the transport device, for example.

While embodiments have been described in which a transport wheel is provided with a plurality of retaining members which are respectively pivotably mounted, other implementations of the retaining members may be used. For illustration, the retaining members on the transport wheel may be mounted to be displaceable in a translatory manner, e.g. linearly displaceable.

While embodiments have been described in which an apparatus which removes springs from a transport wheel is provided with a retaining member which is linearly displaceable relative to the transport device, other implementations of the retaining member may be used. For illustration, the retaining members on the second transport apparatus which removes springs from the transport wheel may be mounted to be pivotable relative to the transport device.

While embodiments have been described in the context of machines for forming pocket springs, apparatuses and methods according to embodiments may also be provided in another machine for forming at least a part of an innerspring unit without requiring the springs to be pocketed.

The apparatuses, machines, and methods according to embodiments of the invention may be used for manufacturing innerspring units for mattresses, sofas, armchairs, or other bedding or seating furniture, without being limited thereto.

The invention claimed is:
1. An apparatus for transporting springs, comprising:
a transport device configured to receive a spring,
a retaining mechanism configured to retain the spring received by the transport device, wherein the retaining mechanism has at least one retaining member which comprises a magnetic material and which is mounted to be displaceable relative to the transport device, and a release mechanism configured to release the spring received by the transport device, wherein the release mechanism is configured to effect a relative displacement between the transport device and the at least one retaining member.

2. The apparatus according to claim 1, wherein the release mechanism comprises a release member configured to selectively engage the retaining mechanism to effect the relative displacement between the transport device and the at least one retaining member.

3. The apparatus according to claim 2, wherein the release member is stationary relative to a frame of the apparatus.

4. The apparatus according to claim 2, wherein the release member is positioned to engage the at least one retaining member when the transport device moves in a first direction and to disengage the at least one retaining member when the transport device moves in a second direction opposite to the first direction.

5. The apparatus according to claim 2, wherein the release member is positioned to engage the at least one retaining member when the transport device moves in a first direction and to disengage the at least one retaining member when the transport device continues to move in the first direction.

6. The apparatus according to claim 2, wherein the at least one retaining member is supported on the transport device such that the at least one retaining member maintains a rest position relative to the transport device until the release member engages the at least one retaining member.

7. The apparatus according to claim 6, further comprising a bias mechanism to bias the at least one retaining member into the rest position relative to the transport device.

8. The apparatus according to claim 1, wherein the at least one retaining member is pivotably supported on the transport device.

9. The apparatus according to claim 1, wherein the at least one retaining member is supported on the transport device to be displaceable in a translatory manner relative to the transport device.

10. The apparatus according to claim 1, wherein the transport device is a transport wheel configured to receive the spring from a spring coiler.

11. The apparatus according to claim 1, wherein the transport device is configured to output the spring to a device for pocketing the spring or for setting the spring.

12. A machine for forming a string of pocket springs, comprising:
a spring coiler configured to form springs;
a device for pocketing or setting the springs formed by the spring coiler; and
at least one apparatus according to claim 1 to transport springs from the spring coiler to the device for pocketing the springs.

13. The machine according to claim 12, wherein a first apparatus according to claim 1 is configured to receive the springs from the spring coiler, and a second apparatus according to claim 1 is configured to receive the springs from the first apparatus and to output the springs to the device for pocketing the springs.

14. A method of transporting springs, comprising:
receiving a spring by a transport device,
retaining the spring on the transport device using at least one retaining member which comprises a magnetic material and which is mounted to be displaceable relative to the transport device,
causing the transport device to move, and
effecting a relative displacement between the at least one retaining member and the transport device to release the spring from the at least one retaining member at a release position.

15. The method according to claim 14, which is performed by the apparatus according to claim 1.

\* \* \* \* \*